United States Patent [19]

Östrup et al.

[11] Patent Number: 6,125,106
[45] Date of Patent: Sep. 26, 2000

[54] METHOD AND APPARATUS FOR CAPACITY DRIVEN INTRA-CELL HANDOVER IN A CELLULAR TELEPHONE NETWORK

[75] Inventors: Peter Östrup, Linköping; Håkan Palm, Rimfosa; Anders Westroos, Linköping, all of Sweden

[73] Assignee: Telefonaktiebolaget L M Ericsson (Publ), Sweden

[21] Appl. No.: 08/917,644

[22] Filed: Aug. 22, 1997

[51] Int. Cl.[7] .......................... G06F 11/00; H04B 7/212; H04Q 7/20
[52] U.S. Cl. .......................... 370/230; 370/341; 370/347; 455/436; 455/450; 455/453
[58] Field of Search ....................... 370/230, 231, 370/232, 235, 328, 329, 331, 341, 336, 337, 345, 347, 465; 455/422, 436, 450, 451, 452, 453

[56] References Cited

U.S. PATENT DOCUMENTS

| | | | |
|---|---|---|---|
| 4,953,180 | 8/1990 | Fleschi et al. | 370/465 |
| 5,343,513 | 8/1994 | Kay et al. | 455/452 |
| 5,471,645 | 11/1995 | Felix | 455/34.2 |
| 5,640,391 | 6/1997 | Nitta et al. | 370/341 |
| 5,805,995 | 9/1998 | Jiang et al. | 455/436 |
| 5,870,675 | 2/1999 | Tuutijarvi et al. | 455/436 |
| 5,884,174 | 3/1999 | Nagarajan et al. | 455/453 |
| 5,907,555 | 5/1999 | Raith | 455/422 |

FOREIGN PATENT DOCUMENTS

45874/96   3/1995   Australia .

0 472 511   8/1991   European Pat. Off. .

OTHER PUBLICATIONS

Ivanovich et al., "Channel Allocation Methods for Half Rate and Full Rate Connection in GSM", 1996 IEEE, ICC, Jun. 23, 1996, pp. 1756–1760.

European Patent Office, Standard Search Report, May 18, 1998, File No. RS 99975 US.

*Primary Examiner*—Alpus H. Hsu
*Assistant Examiner*—Afsar M. Qureshi
*Attorney, Agent, or Firm*—Jenkens & Gilchrist, A Professional Corporation

[57] ABSTRACT

Existing communication connections in a cellular telephone base station can become allocated to communication equipment in a less than optimal fashion. To address this problem a detector identifies when an existing communication connection routed through the base station is terminated. The detector informs a processor which calculates a channel allocation for the remaining communication connections currently routed through the base station which optimizes channel utilization. The optimal channel allocation is then implemented through intra-cell handovers. The optimal channel allocation is based on assigning an existing communication connection having a lower channel rate requirement than is available on the communication channel currently carrying the existing communication connection to a communication channel having a lower channel rate capacity or assigning an existing communication connection from a less restrictive communication channel to a more restrictive communication channel having the same or lower channel rate capacity as the current communication channel.

7 Claims, 3 Drawing Sheets

METHOD AND APPARATUS FOR CAPACITY DRIVEN INTRA-CELL HANDOVER IN A CELLULAR TELEPHONE NETWORK

BACKGROUND OF THE INVENTION

1. Technical Field of the Invention

The present invention pertains in general to techniques for maximizing utilization of communication capacity in a communication network and, more particularly, to a method and apparatus for performing intra-cell handovers of existing communication connections in a cellular telephone network base station to optimize utilization of communication equipment.

2. Description of Related Art

In a cellular telephone network each base station is outfitted with communication equipment for effectuating communication with mobile stations via a communication channel on an air interface. The communication equipment often has different channel rate capacities and restrictions. To better understand these distinctions the following terms are defined as follows:

Channel Rate—The channel rate indicates the communication rate presently in use for a traffic channel. Possible values are full rate and half rate.

Channel Rate Capacity—Channel rate capacity denotes the communication rate capability of a channel. Possible values are dual rate and full rate only.

Dual Rate Channel Pair—A dual rate channel pair denotes a pair of channels on dual rate communication equipment which together provide a resource capable of carrying one full rate connection or two half rate connections. A dual rate channel pair consists of the channels corresponding to the air interface time slots TS0/TS3, TS1/TS4, or TS2/TS5 in the Personal Digital Cellular (PDC) protocol.

Dual Rate Communication Equipment—Dual rate communication equipment denotes base station communication equipment which provides resources capable of carrying full rate and half rate connections. Dual rate communication equipment provides three dual rate channel pairs.

Dual Rate Traffic Channel—A dual rate traffic channel denotes one of two traffic channels included in a dual rate channel pair. A dual rate traffic channel is capable of carrying a half rate connection. Together with the other dual rate traffic channel in the dual rate channel pair, the two dual rate traffic channels are capable of carrying a full rate connection.

Full Rate Only Communication Equipment—Full rate only communication equipment denotes base station communication equipment providing resources capable of carrying full rate connections. Full rate communication equipment provides three full rate channels.

Full Rate Only Traffic Channel—A full rate only traffic channel denotes a traffic channel capable of carrying full rate connections only.

Full Rate Traffic Channel—A full rate traffic channel represents a traffic channel carrying a full rate connection. In the PDC air interface, a full rate traffic channel corresponds to one full rate time slot, TS0, TS1 and TS2. One full rate time slot corresponds to two half rate time slots.

Half Rate Traffic Channel—A half rate traffic channel represents a traffic channel capable of carrying a half rate connection. In the PDC air interface, a half rate traffic channel corresponds to one half rate time slot, TS0, TS1, TS2, TS3, TS4 or TS5.

Full rate only mobile station—A full rate only mobile station is a mobile station which can only utilize a full rate connection.

Dual rate mobile station—A dual rate mobile station is a mobile station which can utilize a full rate connection or a half rate connection.

Full Rate Connection (FRC)—A full rate connection is a communication connection between a base station and a mobile station carried on either a full rate only traffic channel or a full rate traffic channel.

Half-Rate Connection (HRC)—A half rate connection is a communication connection between a base station and a mobile station carried on a half rate traffic channel.

Half Rate Capable Connection (HRCC)—A half rate capable connection is the equivalent of a full rate connection in that it is a communication connection between a base station and a dual rate mobile station carried on a full rate only traffic channel, however, the underlying communication requirements only necessitate the use of a half rate connection despite the use of a full rate only traffic channel. For example, whereas a facsimile or modem communication between the base station and mobile station requires the use of a full rate connection, a voice communication requires only a half rate connection. Thus, in circumstances where a half rate traffic channel is unavailable, a half rate capable connection is used. In these circumstances, half of the communication capacity of the full rate only traffic channel is unnecessary and essentially lost.

Referring now to FIG. 1, there is illustrated a functional block diagram representing channel rate capacities and restrictions of communication equipment in a cellular telephone base station. Although the description is directed toward a base station implementing Personal Digital Cellular (PDC) protocol, the concepts and issues presented also apply to other protocols. A cellular telephone base station 100 comprises full rate only equipment 110 including, for example, three full rate only traffic channels 130, 140 and 150 on time slots TS0, TS1 and TS2 respectively. The cellular telephone base station 100 further comprises dual rate equipment 120 including, for example, three dual rate channel pairs 160, 170 and 180. Each dual rate channel pair comprises two dual rate traffic channels 161, 162, 171, 172, 181 and 182 on time slots TS0, TS1, TS2, TS3, TS4 and TS5 respectively. Each of the full rate only traffic channels 130, 140 and 150 can carry either a full rate connection or a half rate capable connection. Since the underlying communication requirement of the half rate capable connection is equivalent to a half rate connection, half of the channel communication capacity is lost when carrying a half rate capable connection on a full rate only traffic channel. On the other hand, each dual rate channel pair 160, 170 and 180 can carry either a single full rate connection or two half rate connections. A full rate connection, however, can not be split between two separate dual rate channel pairs.

As communication connections between the cellular telephone base station 100 and mobile stations are established and subsequently terminated, situations result where existing communication connections become allocated to the communication equipment in a less than optimal fashion. The following examples are provided to illustrate how such situations can arise. Other situations are possible and the examples given are not intended to be an exhaustive list.

In a first example, all dual rate traffic channels 161, 162, 171, 172, 181 and 182 of the dual rate equipment 120 are in use as are all the full rate only traffic channels 130, 140 and 150 of the full rate only equipment 110. If two half rate connections on the dual rate traffic channels of two distinct dual rate channel pairs subsequently terminate, for example dual rate traffic channels 161 and 171, no new full rate connections can be established. No new full rate connections can be established due to the restriction that a full rate connection can not be split between distinct dual rate channel pairs even though the cellular telephone base station 100 has available communication capacity (dual rate traffic channels 161 and 171) to carry a new full rate connection.

In a second example, all the full rate only traffic channels 130, 140 and 150 of the full rate only equipment 110 are in use and all but one of the dual rate traffic channels, for example dual rate traffic channel 182, of the dual rate equipment 120 are also in use. If a half rate connection on one of the dual rate traffic channels 161, 162, 171 and 172 of the two respective dual rate channel pairs 160 and 170 terminates, for example dual rate traffic channel 172, a situation arises wherein the cellular telephone base station 100 has available communication capacity (dual rate traffic channels 172 and 182) to carry a full rate connection but since a full rate connection can not exist on distinct dual rate channel pairs, the cellular telephone base station 100 can not carry a new full rate connection.

In a third example, all the dual rate channel traffic channels 161, 162, 171, 172, 181 and 182 are in use. Furthermore, all the full rate only traffic channels 130, 140 and 150 are in use with at least one full rate only traffic channel, for example full rate only traffic channel 150, carrying a half rate capable connection. If a half rate connection on one of the dual rate traffic channels, for example dual rate traffic channel 172 terminates, the cellular telephone base station 100 can not carry another full rate connection even though it has available communication capacity (dual rate traffic channel 172 and the lost communication capacity of the full rate only traffic channel 150) to carry a new full rate connection.

Although other examples exist, these three scenarios illustrate how a less than optimal utilization of the communication equipment of the cellular telephone base station 100 can result when calls are terminated. There is a need therefore, for a method and apparatus to reallocate existing communication connections between communication channels in a cellular telephone base station as existing communication connections are terminated in order that utilization of the communication equipment can be optimized.

SUMMARY OF THE INVENTION

The present invention comprises a method and apparatus for optimizing channel utilization in a cellular telephone network base station. A communication connection termination detector detects when an existing communication connection routed through the base station is terminated. The detector informs a processor which calculates a channel allocation for the remaining communication connections currently routed through the base station which optimizes channel utilization. The optimal channel allocation is based on assigning an existing communication connection having a lower channel rate requirement than is available on the communication channel currently carrying the existing communication connection to a communication channel having a lower channel rate capacity or assigning an existing communication connection from a less restrictive communication channel to a more restrictive communication channel having the same or lower channel rate capacity as the current communication channel. An existing communication connection is then handed over between communication channels within the base station to effectuate the calculated optimal channel allocation.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

The definitions previously defined are further used in describing the present invention. The following description of the method and apparatus of the present invention illustrates a preferred embodiment for use with a cellular telephone base station having full rate only and dual rate equipment supporting full rate only traffic channels and dual rate traffic channels respectively. It is understood, however, that these channel rates were used by way of example and that the present invention is not limited to equipment with these capacities but is applicable to equipment having any capacity combinations. Furthermore, the following description describes various scenarios whereby the present invention optimizes channel utilization. These scenarios are provided to illustrate the operation of the present invention and are not meant to be an exhaustive list of all possible scenarios. It is, therefore, understood that different combinations of channel rate capacities and restrictions are possible. Still further, the following description follows the Personal Digital Cellular (PDC) protocol and time slots. It is understood that PDC was used by way of example and that the present invention is not limited to PDC protocol and time slots.

Figure 1:
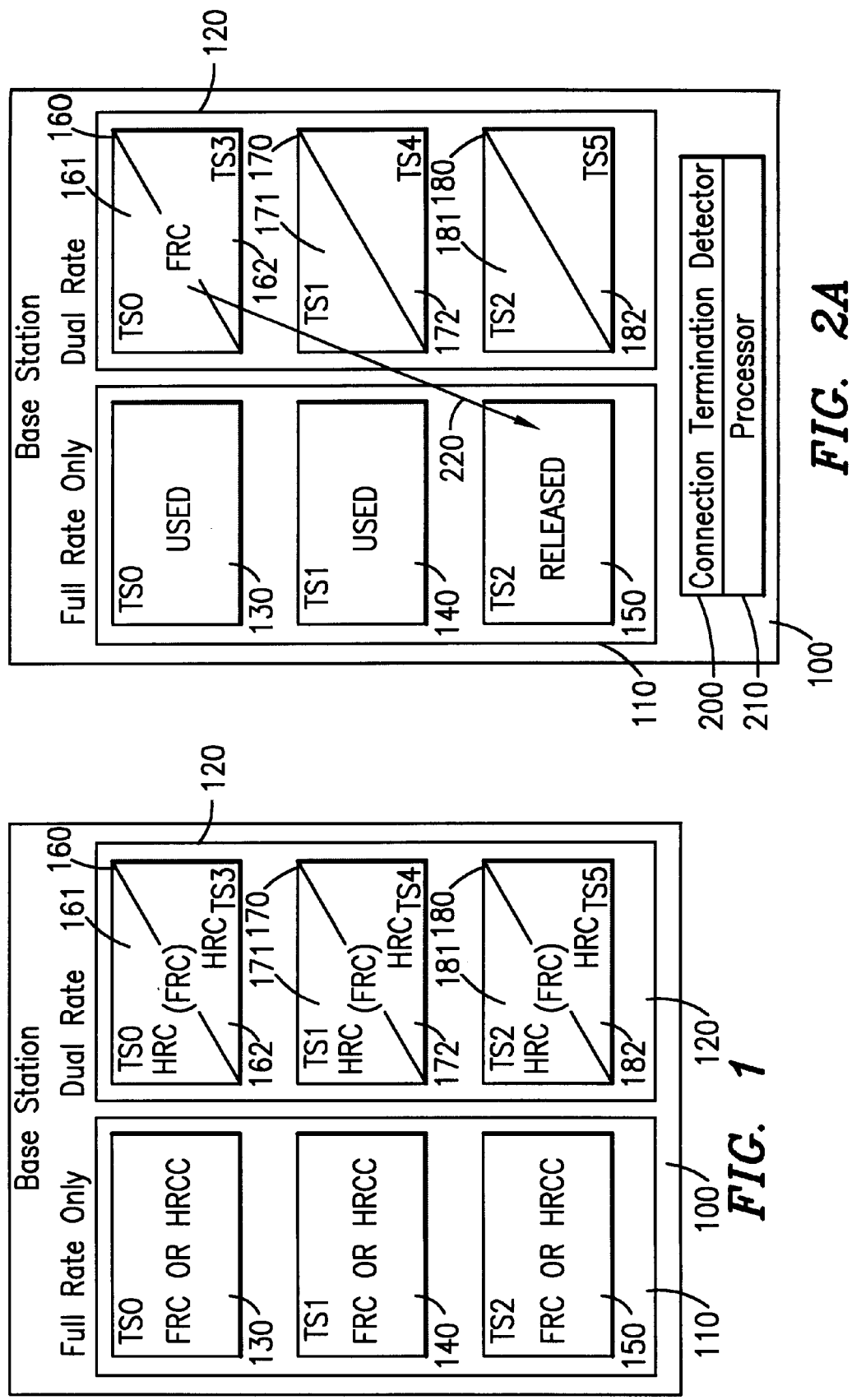
FIG. 1, previously described, is a functional block diagram representing channel rate capacities and restrictions of communication equipment in a cellular telephone base station.
Figure 2:
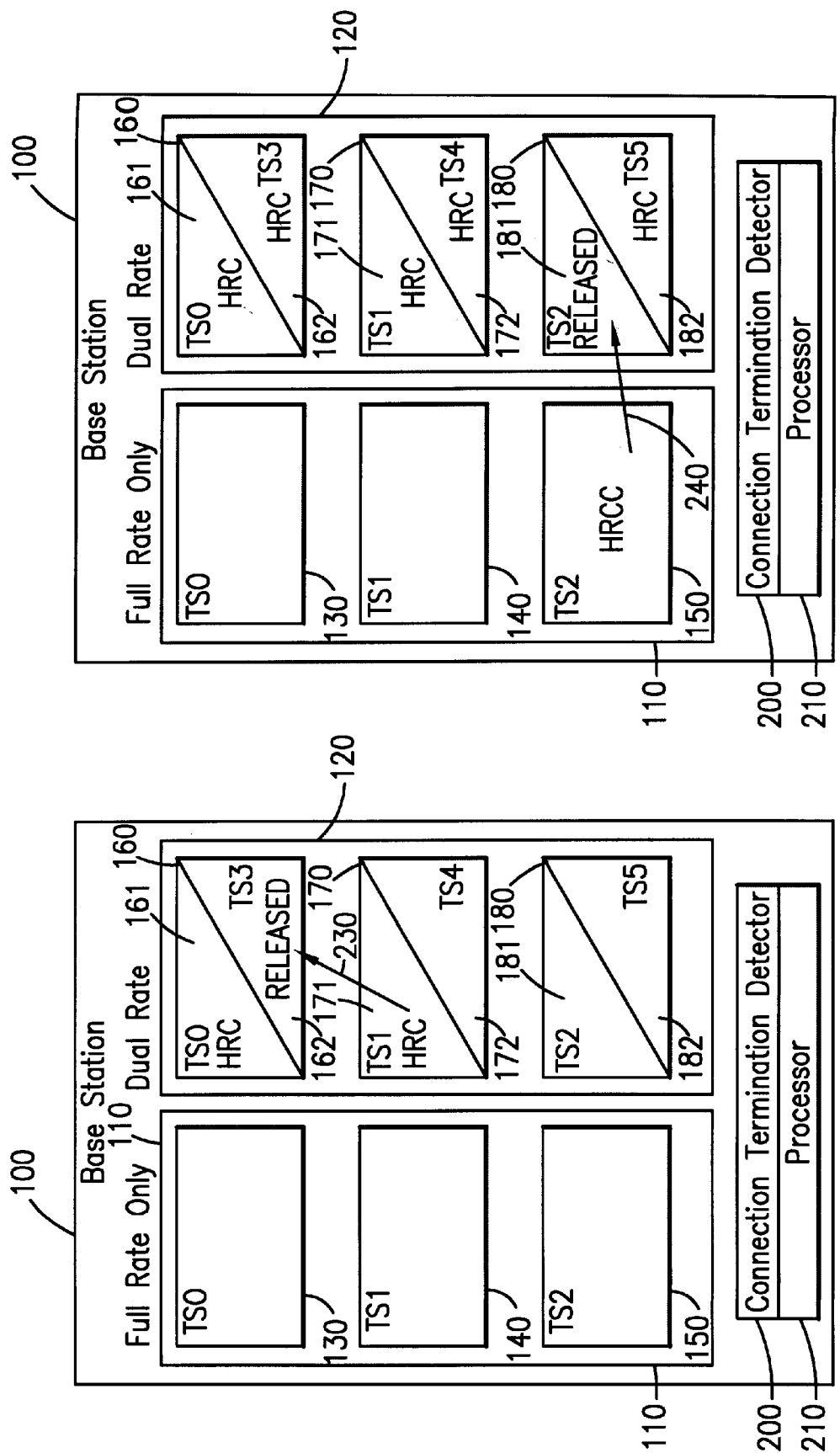
FIG. 2A is a functional block diagram of a cellular telephone base station including an apparatus for optimizing channel utilization in response to a first exemplary channel allocation.
FIG. 2B is a functional block diagram of a cellular telephone base station including an apparatus for optimizing channel utilization in response to a second exemplary channel allocation.
FIG. 2C is a functional block diagram of a cellular telephone base station including an apparatus for optimizing channel utilization in response to a third exemplary channel allocation.

Referring now to FIG. 2A, there is illustrated a functional block diagram of a cellular telephone base station 100 including an apparatus for optimizing channel utilization in response to a first exemplary channel allocation. The cellular telephone base station 100 comprises full rate only equipment 110 including, for example, three full rate only traffic channels 130, 140 and 150 on time slots TS0, TS1 and TS2 respectively. The cellular telephone base station 100 further comprises dual rate equipment 120 including, for example, three dual rate channel pairs 160, 170 and 180. Each dual rate channel pair comprises two dual rate traffic channels 161, 162, 171, 172, 181 and 182 on time slots TS0, TS1, TS2, TS3, TS4 and TS5 respectively. The apparatus of the present invention comprises a connection termination detector 200 and a processor 210.

In a first scenario the full rate only traffic channels 130, 140 and 150 are each in use supporting either existing full rate connections or existing half rate capable connections in any combination. At least one of the dual rate channel pairs 160, 170 or 180 is in use supporting an existing full rate connection. The remaining dual rate channel pairs may be unused or in use supporting any combination of existing full rate connections or existing half rate connections. When the connection on any one of the full rate only traffic channels 130, 140 or 150 is terminated, the connection termination detector 200 detects the termination and informs the processor 210. The processor 210 calculates a new channel allocation in a manner consistent with the method of the present invention (described in FIG. 3) and performs a handover 220 of the full rate connection existing on one of the dual rate channel pairs, in this example dual rate channel pair 160, to the newly available full rate only traffic channel, in this case full rate only traffic channel 150. By performing the handover 220 of the existing full rate connection from the dual rate channel pair 160 of the dual rate equipment 120 to the newly available full rate only traffic channel 150 of the full rate only communication equipment 110, the existing communication connections are optimally matched to the channel rate capacities and restrictions of the communication equipment of the cellular telephone base station 100.

Referring additionally now to FIG. 2B, there is illustrated a functional block diagram of the cellular telephone base station 100 including the apparatus for optimizing channel utilization in response to a second exemplary channel allocation. In this second scenario at least one dual rate channel pair, in this example dual rate channel pair 160, is carrying two dual rate connections on its two dual rate traffic channels, in this example dual rate traffic channels 161 and 162. Furthermore, a second dual rate channel pair, in this example dual rate channel pair 170, is carrying one dual rate connection on one of its dual rate traffic channels, in this example dual rate traffic channel 171. When one of the dual rate connections on one of the dual rate traffic channels, in this example dual rate traffic channel 162, of the completely used dual rate channel pair 160 is terminated, the connection termination detector 200 detects the termination and informs the processor 210. The processor 210 calculates a new channel allocation in a manner consistent with the method of the present invention (described in FIG. 3) and performs a handover 230 of the half rate connection existing on the dual rate traffic channel 171 to the dual rate traffic channel 162 in order to pair-up the remaining two dual rate connections remaining on distinct dual rate channels 160 and 170 as a result of the termination of the communication connection on dual rate traffic channel 171. By performing the handover 230 to pair-up the two half rate connections, the existing communication connections are optimally matched to the channel rate capacities and restrictions of the communication equipment of the cellular telephone base station 100.

Referring additionally now to FIG. 2C there is illustrated a functional block diagram of a cellular telephone base station 100 including an apparatus for optimizing channel utilization in response to a third exemplary channel allocation. In this third scenario, all dual rate traffic channels 161, 162, 171, 172, 181 and 182 of the dual rate communication equipment 120 are in use. Furthermore, at least one of the full rate only traffic channels, in this example full rate only traffic channel 150, is in use carrying a half rate capable connection. When one of the dual rate connections on one of the dual rate traffic channels 161, 162, 171, 172, 181 or 182 of the dual rate communication equipment 120 terminates, in this example dual rate traffic channel 181, the connection termination detector 200 detects the termination and informs the processor 210. The processor 210 calculates a new channel allocation in a manner consistent with the method of the present invention (described in FIG. 3) and performs a handover 240 of the half rate capable connection existing on the full rate only traffic channel, in this example full rate only traffic channel 150, to the newly available dual rate traffic channel, in this example dual rate traffic channel 181. As the handover occurs, the dual rate mobile station switches from a full rate to half rate communication mode. To perform the handover, the mobile station needs to be a dual rate mobile station. In the preferred embodiment, the processor 210 has obtained prior knowledge, for example during setup of the communication connection, as to the capabilities of the mobile station and performs the handover only if the mobile station is a dual rate mobile station. If the processor 210 has no knowledge of the capabilities of the mobile station, the processor 210 determines the capabilities of the mobile station prior to a handover, for example by querying the mobile station. By performing the handover 240 of the existing half rate capable connection from the full rate only traffic channel 150 of the full rate only communication equipment 110 to the newly available dual rate traffic channel 181 of the dual rate communication equipment 120, the existing communication connections are optimally matched to the channel rate capacities and restrictions of the communication equipment of the cellular telephone base station 100.

Figure 3:
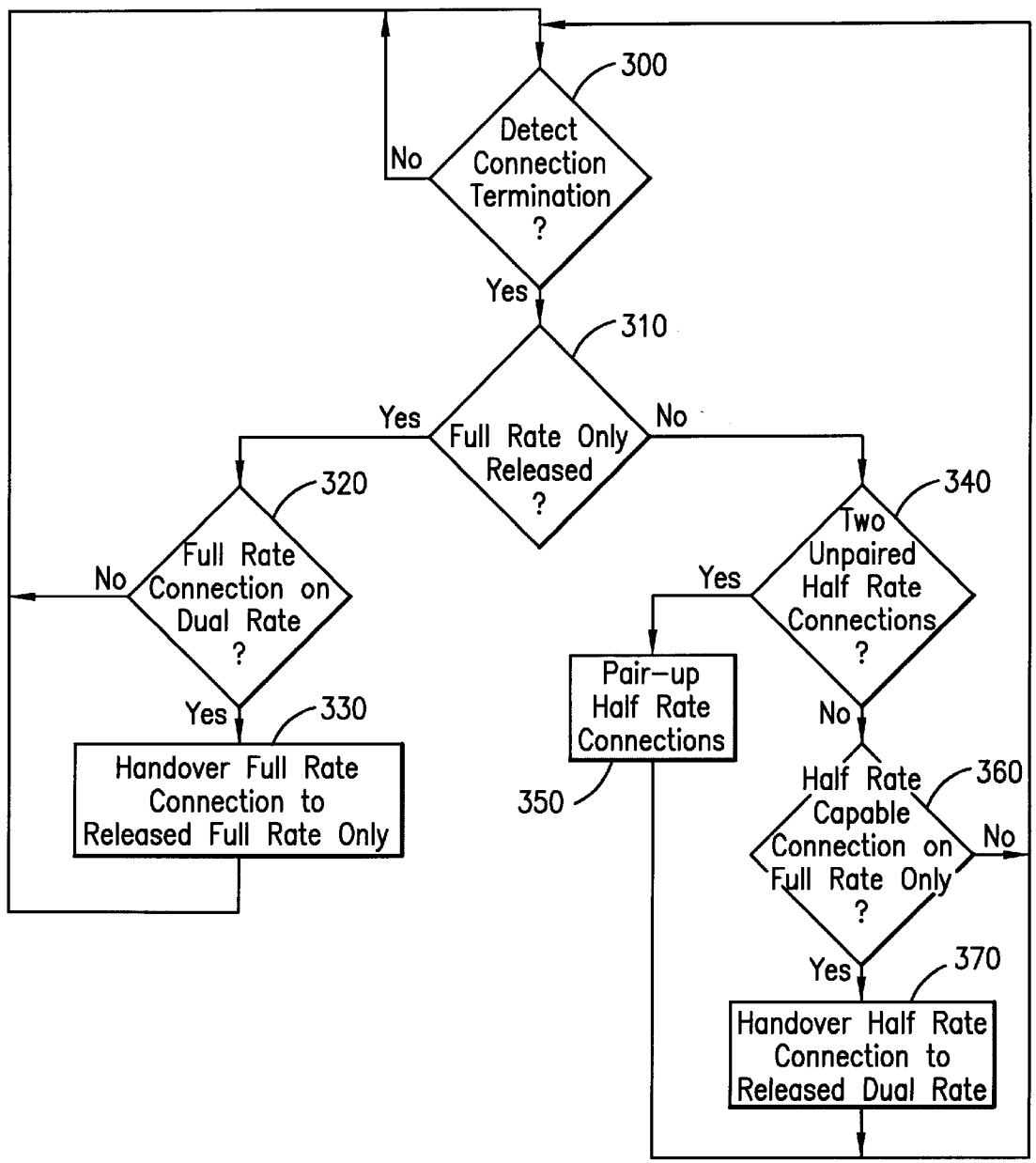
FIG. 3 is a flow diagram of a method consistent with the present invention for optimizing channel utilization in a cellular telephone base station.

Referring additionally now to FIG. 3, there is illustrated a flow diagram of a method for optimizing channel utilization of the present invention. In essence, the optimal channel allocation is based on assigning an existing communication connection having a lower channel rate requirement than is available on the communication channel currently carrying the existing communication connection to a communication channel having a lower channel rate capacity or assigning an existing communication connection from a less restrictive communication channel to a more restrictive communication channel having the same or lower channel rate capacity as the current communication channel.

In particular, communication connections routed through a cellular telephone base station are continually monitored to detect termination of a connection (step 300). Upon detection of the connection termination, a determination is made as to whether the released channel was a full rate only traffic channel (step 310) (if it was not then by default a dual rate traffic channel was released). If it is determined that the released channel is a full rate only traffic channel, a determination is then made as to whether a full rate connection exists on a dual rate channel pair (step 320). If a full rate connection exists on a dual rate channel pair, a handover is performed transferring the full rate connection from the dual rate channel pair to the released full rate only traffic channel (step 330) and a return is made to monitoring for a connection termination in step 300. Alternatively, if it was determined in step 320 that no full rate connection exists on a dual rate channel pair, a return is made to monitoring for a connection termination in step 300.

If in step 310 it is determined that a full rate only traffic channel was not released then by default a dual rate traffic channel was released. In this case, a determination is made as to whether two unpaired dual rate connections exist on distinct dual rate channel pairs with each dual rate channel pair carrying only a single dual rate connection (step 340). If the determination is in the affirmative, one of the dual rate connections is handed over from one dual rate channel pair to the other dual rate channel pair (step 350) resulting in one dual rate channel pair carrying a dual rate connection on each of its dual rate traffic channels and the other dual rate channel pair carrying no connections.

If in step 340 it is determined that two unpaired dual rate connections do not exist, a determination is made as to whether a half rate capable connection exists on a full rate only traffic channel, whether the mobile station is a dual rate mobile station and whether there is an available dual rate traffic channel (step 360). If a half rate capable connection does not exist on a full rate only traffic channel or the mobile station is not a dual rate mobile station or a dual rate traffic channel is unavailable a return is made to monitoring for a connection termination in step 300. Otherwise, a handover is made of the half rate capable connection from the full rate only traffic channel to the available dual rate traffic channel (step 370) and a return is made to monitoring for a connection termination in step 300.

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for optimizing channel utilization in a cellular telephone network base station comprising the steps of:

calculating, for existing communication connections routed through the base station, a channel allocation which optimizes channel utilization; and based on said channel allocation, handing over existing communication connections between communication channels within the base station, including handing over one communication connection from a first communication channel to a second communication channel that can accommodate the one communication connection, wherein one of the first and second communication channels has a lower channel rate capacity than the other.

2. The method recited in claim 1, wherein the step of calculating a channel allocation comprises the step of:

assigning an existing communication connection having a lower channel rate requirement than is available on a communication channel currently carrying the communication connection to a communication channel having a lower channel rate capacity.

3. The method recited in claim 1, wherein the step of calculating a channel allocation comprises the step of:

assigning an existing communication connection from a less restrictive communication channel to a more restrictive communication channel having a same or lower channel rate capacity.

4. A method for optimizing channel utilization in a cellular telephone network base station comprising the steps of:

detecting when an existing communication connection routed through the base station is terminated and its corresponding communication channel released;

calculating, for remaining communication connections currently routed through the base station, a channel allocation which optimizes channel utilization, including recognizing that one of the released communication channel and a currently active communication channel has a lower channel rate capacity than the other; and based on said channel allocation, handing over one of the remaining communication connections from said currently active communication channel to the released communication channel.

5. The method recited in claim 4, wherein the step of calculating a channel allocation further includes the steps of:

identifying a full rate connection existing on a dual rate channel pair;

identifying the released communication channel as a full rate only traffic channel; and wherein the step of handing over one of the remaining communication connections further includes:

handing over the full rate connection existing on the dual rate channel pair to the released full rate only traffic channel.

6. The method recited in claim 4, wherein the step of calculating a channel allocation further includes the steps of:

identifying a half rate capable connection existing on a full rate only traffic channel;

identifying the released communication channel as a half rate traffic channel; and wherein the step of handing over one of the remaining communication connections further includes:

handing over the half rate capable connection existing on the full rate only traffic channel to the released half rate traffic channel.

7. An apparatus for optimizing channel utilization in a cellular telephone network base station comprising:

a connection termination detector for detecting when a communication connection is terminated and further for providing information indicative of the termination and a traffic channel which was released as a result of the termination; and a processor coupled to said detector and responsive to said information for calculating, for existing communication connections currently routed through the base station, a channel allocation which optimizes channel utilization, said processor, in calculating said channel allocation, operable to recognize that one of the released traffic channel and a currently active traffic channel has a lower channel rate capacity than the other, and said channel allocation indicating that one of the existing communication connections is to be handed over from said currently active communication channel to the released communication channel.

* * * * *